US012153978B2

(12) United States Patent
Yee et al.

(10) Patent No.: US 12,153,978 B2
(45) Date of Patent: Nov. 26, 2024

(54) TRANSACTION CARD WITH DISPLACEABLE BEADS

(71) Applicant: Capital One Services, LLC, McLean, VA (US)

(72) Inventors: Bryant Yee, Silver Spring, MD (US); Tyler Maiman, Melville, NY (US); Kevin Osborn, Newton Highlands, MA (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 18/098,958

(22) Filed: Jan. 19, 2023

(65) Prior Publication Data
US 2024/0249098 A1    Jul. 25, 2024

(51) Int. Cl.
*G06K 19/02* (2006.01)
*G06K 19/077* (2006.01)

(52) U.S. Cl.
CPC ..... *G06K 19/025* (2013.01); *G06K 19/07722* (2013.01)

(58) Field of Classification Search
CPC ............. G06K 19/0715; G06K 19/025; G06K 19/07722; G06K 19/0723; G06K 19/07707; G06K 19/07739; G06K 7/087; G06K 19/07705; G06K 19/06196; G06K 19/07; G06K 19/071; G02F 1/167; G02F 2001/1678; G02F 1/1671; G02F 1/13; G02F 1/16757; G02F 1/0105; G02F 1/1343; G02F 2202/36; G02F 1/133305; G03G 9/0804; G03G 9/0806; G03G 9/0827
See application file for complete search history.

(56) References Cited

U.S. PATENT DOCUMENTS

2017/0309215 A1* 10/2017 Perdices-Gonzalez ...................... G09G 3/32
2020/0225569 A1*  7/2020 Kurashige .............. G03B 21/60

FOREIGN PATENT DOCUMENTS

CA    2990227 A1 *  6/2018 ............. G06K 19/02
JP    2009086067 A *  4/2009

OTHER PUBLICATIONS

Marcus, "The Spectrum" (Year: 2003).*
Nguyen, Preconcentration and separation of doublestranded DNA fragments by electrophoresis in plastic microfluidic devices (Year: 2003).*

* cited by examiner

*Primary Examiner* — Thien T Mai
(74) *Attorney, Agent, or Firm* — KDW Firm PLLC

(57) ABSTRACT

Provided are approaches for providing card information in a highly secure and convenient manner. In some approaches, a transaction card may include a body having a first main side opposite a second main side, wherein a first outer layer extends along the first main side, and an internal layer adjacent the first outer layer, wherein one or more visual features are provided on the internal layer. The transaction card may further include a plurality of beads within a carrier, wherein the plurality of beads and the carrier are positioned between the internal layer and the first outer layer, wherein a force applied to the first main side of the body displaces one or more beads of the plurality of beads.

20 Claims, 4 Drawing Sheets

TRANSACTION CARD WITH DISPLACEABLE BEADS

FIELD

Embodiments of the present disclosure relate to transaction cards and, more particularly, to transaction cards including a plurality of displaceable beads.

BACKGROUND

A primary account number and other types of card information, such as expiration date, card verification value, card provider, etc., may be physically printed onto a card, which can be easily stolen or compromised by fraudsters. For example, card numbers and related information can be stolen using cameras at payment terminals. One possible method of thwarting card information theft is to provide a card with just the payment instrument (e.g., chip, magnetic stripe) and no printed card information. While this may be a helpful from a security standpoint, cards without the standard printed information may be inconvenient for the user in some use cases and should not be the only security measure.

Accordingly, there is a need for providing card information in a highly secure and convenient manner. It is with respect to this and other considerations that the present improvements are provided.

SUMMARY

This Summary is provided to introduce a selection of concepts in a simplified form that are further described below in the Detailed Description. This Summary is not intended to identify key features or essential features of the claimed subject matter, nor is it intended as an aid in determining the scope of the claimed subject matter.

In at least one approach according to the disclosure, a transaction card may include a body having a first main side opposite a second main side, wherein a first outer layer extends along the first main side, and an internal layer adjacent the first outer layer, wherein one or more visual features are provided on the internal layer. The transaction card may further include a plurality of beads within a carrier, wherein the plurality of beads and the carrier are positioned between the internal layer and the first outer layer, wherein a force applied to the first main side of the body displaces one or more beads of the plurality of beads.

In another approach according to the disclosure, a transaction card may include a body having a first main side opposite a second main side, wherein a first outer layer extends along the first main side, and wherein a second outer layer extends along the second main side. The transaction card may further include an internal layer between the first and second outer layers, wherein the internal layer comprises an internal layer first side opposite an internal layer second side, and wherein one or more visual features are provided on the internal layer first side. The transaction card may further include a plurality of beads and a carrier positioned between the internal layer first side and the first outer layer, wherein a force applied to the first main side of the body displaces one or more beads of the plurality of beads.

In yet another approach according to the disclosure, a transaction card may include a body having a first main side opposite a second main side, wherein a first outer layer extends along the first main side, and wherein a second outer layer extends along the second main side. The transaction card may further include an internal layer between the first and second outer layers, wherein the internal layer comprises an internal layer first side opposite an internal layer second side, and wherein one or more visual features are provided on the internal layer first side. The transaction card may further include a plurality of beads and a carrier positioned between the internal layer first side and the first outer layer, wherein in a first configuration the plurality of beads are positioned over the one or more visual features to visually obscure the one or more visual features, and wherein in a second configuration, the one or more beads of the plurality of beads are displaced to expose the one or more visual features.

BRIEF DESCRIPTION OF THE DRAWINGS

The accompanying drawings illustrate example approaches of the disclosure, including the practical application of the principles thereof, as follows.

Figure 1A:
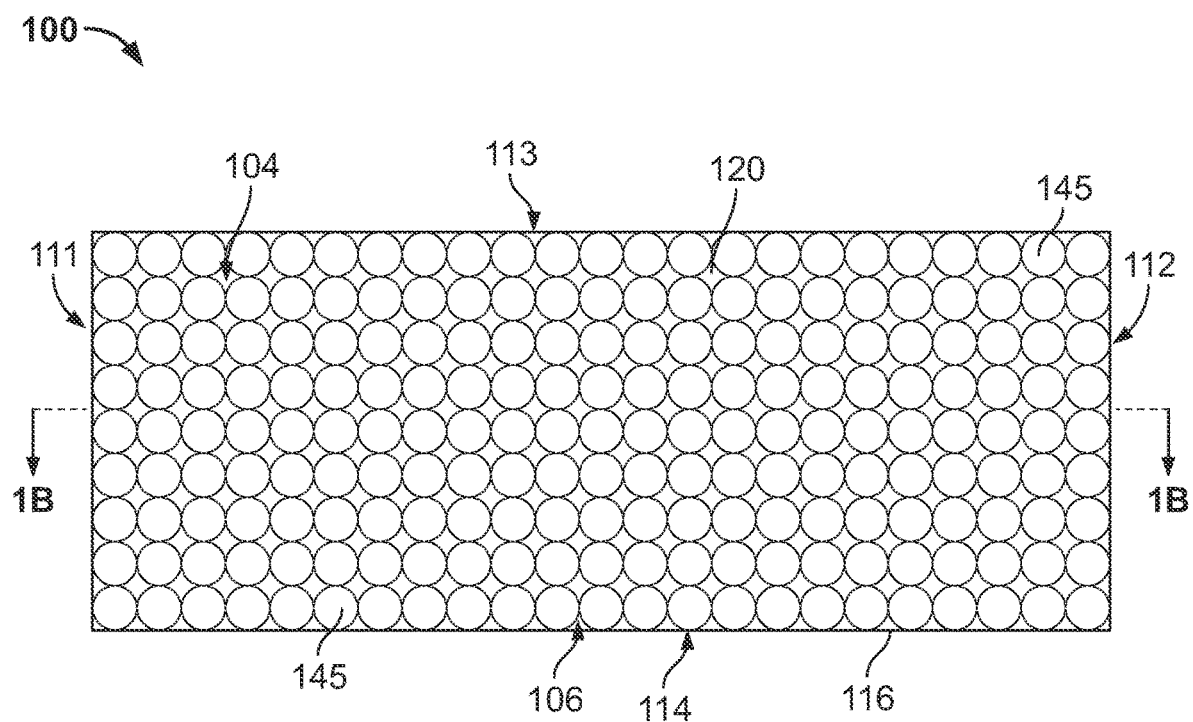
FIG. 1A is a top view illustrating a transaction card, in accordance with some embodiments of the present disclosure.

The drawings are not necessarily to scale. The drawings are merely representations, not intended to portray specific parameters of the disclosure. The drawings are intended to depict example embodiments of the disclosure, and therefore are not to be considered as limiting in scope. In the drawings, like numbering represents like elements.

Furthermore, certain elements in some of the figures may be omitted, or illustrated not-to-scale, for illustrative clarity. The cross-sectional views may be in the form of "slices", or "near-sighted" cross-sectional views, omitting certain background lines otherwise visible in a "true" cross-sectional view, for illustrative clarity. Furthermore, some reference numbers may be omitted in certain drawings.

DETAILED DESCRIPTION

The present embodiments will now be described more fully hereinafter with reference to the accompanying drawings, where some embodiments are shown. The subject matter of the present disclosure may be embodied in many different forms and are not to be construed as limited to the embodiments set forth herein. These embodiments are provided so this disclosure will be thorough and complete, and will fully convey the scope of the subject matter to those skilled in the art. In the drawings, like numbers refer to like elements throughout.

Embodiments herein are directed to transaction cards including a security feature in which sensitive card information visible on the card is revealed in response to pressure from a user. Beads may be suspended in a high viscosity liquid layer that's overlaid on top of a layer with the sensitive card information. When the card is compressed by the user's fingers, the suspended beads move towards the perimeter of the card to reveal the sensitive card information. The viscosity of the liquid slows the refilling of the vacant area long enough to read the sensitive card information. After a period of time, the re-balanced pressure of the encapsulation forces the beads back into the vacant space(s) over the sensitive card information. As set forth herein, sensitive card information may broadly refer to any information associated with the card that is susceptible to theft, such as the card number (e.g., primary account number), CVV, expiration date, etc.

Referring now to FIGS. 1A-2B, an example transaction card (hereinafter "card") 100 according to embodiments of the disclosure will be described. The card 100 may include a body 104 having a first main side 106 opposite a second main side 108. Although non-limiting, the first main side 106 may correspond to a front or top side of the card 100, while the second main side 108 may correspond to a back or bottom side of the card 100. The body 104 may further include a first end 111 opposite a second end 112, and a first side 113 opposite a second side 114.

The card 100 may be a payment card, such as a credit card, debit card, or gift card, issued by a service provider displayed on the first or second main sides 106, 108. In some examples, the card is not related to a payment card, and may include, without limitation, an identification card. In some examples, the payment card may include a dual interface contactless payment card.

The card 100 may include a plurality of laminated layers composed of plastics, metals, and/or other materials. Exemplary materials may include polyvinyl chloride, polyvinyl chloride acetate, acrylonitrile butadiene styrene, polycarbonate, polyesters, anodized titanium, palladium, gold, carbon, paper, biodegradable materials, and/or combinations of one or more such materials. More specifically, the body 104 may include a first outer layer 116 extending along the first main side 106, a second outer layer 118 extending along the second main side 108, and an internal layer 120 sandwiched between the first outer layer 116 and the second outer layer 118. In some embodiments, the second outer layer 118 may be directly coupled to a bottom surface 124 of the internal layer 120. An upper surface 125 of the internal layer 120 may have a variety of different visual features, such as sensitive account identification indicia 126 (FIG. 2A) in a central area 127 thereof. The visual features may further include images, graphics, corporate logos, etc. The first outer layer 116 and/or the second outer layer 118 may be transparent in some embodiments, while the internal layer 120 may be opaque or translucent. It will be appreciated that the card 100 may include additional layers in other embodiments.

Although not shown, the card 100 may further include one or more magnetic stripes provided along the first or second main sides 106, 108 of the body 104. In the embodiment shown, the magnetic stripe may be a part of the second outer layer 118 along the second main side 108. As known, the magnetic stripe may contain cardholder data in accordance with standard protocols.

In some embodiments, the card 100 may be configured to establish contact with another communication device, such as a user device, smart phone, laptop, desktop, or tablet computer. To accomplish this, the card 100 may include processing circuitry, one or more antennas, and other components not shown. These components may be embedded within the body 104.

As further shown, the card 100 may include a plurality of beads 145 (e.g., microspheres) and a carrier 148 disposed in a cavity 146, which is defined by the internal layer 120 and the first outer layer 116. In some embodiments, the carrier 148 is a viscous liquid, such as a gel (e.g., polymer gel), oil, alcohol, organic gelatin, gum, silicon lubricant, etc. This list is not exhaustive, however, and it will be appreciated that many other substances operable to influence movement of the beads 145 may be used as the carrier 148. In various embodiments, the carrier 148 may be transparent or translucent, and/or may be pigmented to a desired color. In one example, the carrier 148 may be 50% opaque at full depth, and then become more transparent as it thins out in response to pressure from the first outer layer 116. In some embodiments, carrier 148 may further include visual enhancements, such as a reflective particles or flakes (e.g., glitter).

In some embodiments, the beads 145 may be micro-glass beads that cause a surface to reflect light back to a source of the light. Although non-limiting, the beads may be substantially round or rounded, and may be injected or deposited into the carrier 148 by a suitable applicator at a desired rate. The beads may be equally sized and shaped. In other embodiments, the beads may be unequally sized and/or shaped. The beads 145 may be quartz, plastic, ceramic, or a combination thereof, and may be hollow or solid. Furthermore, the beads 145 may be opaque or translucent, and may be colored as desired. For example, some or all of the beads 145 may include an internal, colored dye. Although non-limiting, sizes of the beads 145 may range from about 1 micron to about 20 microns in diameter, including about 5 microns, 10 microns, and 15 microns. It will be appreciated that the beads 145 are not shown to scale. The beads 145 may also act as a viscosity modifier, lowering or raising the viscosity of the carrier 148, as desired.

In some embodiments, the card 100 may be manufactured with a ridge or raised perimeter (not shown) extending away from the upper surface 125 of the internal layer 120, to further define the cavity 146. The carrier 148 and the beads 145 may be deposited into the cavity 146, and the first outer layer 116 may be secured (e.g., laminated) to the raised perimeter to enclose the carrier 148 and the beads 145 within the cavity 146. In other embodiments, the carrier 148 and the beads 145 may be injected into a flexible pocket or pouch, which is sealed and then secured to the internal layer 120. If present, the flexible pocket may be secured to the raised perimeter. In some embodiments, the flexible pocket may be made from a transparent or translucent material, and may be sized to cover all or just some of the internal layer 120. The first outer layer 116 may then be formed over the flexible pocket.

Figure 1B:
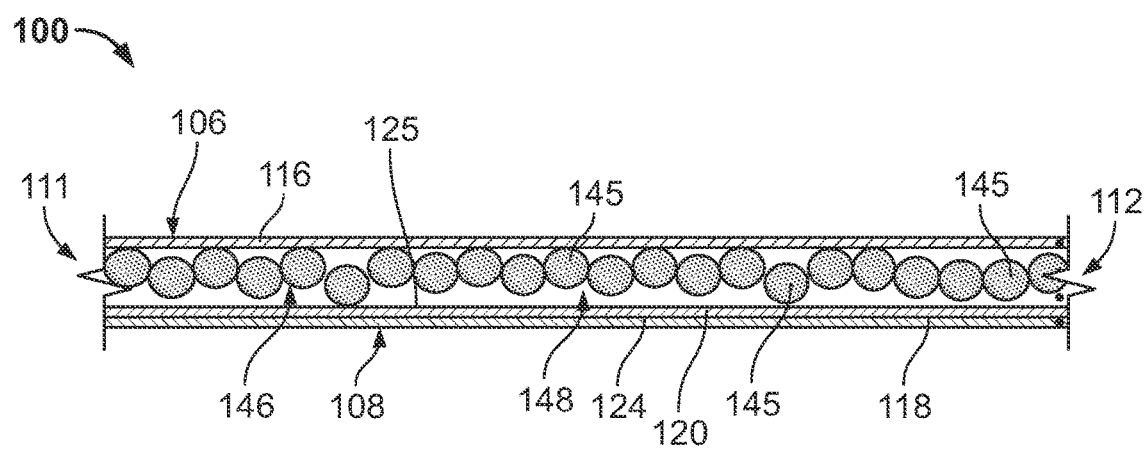
FIG. 1B is a side cross-sectional view along cutline A-A' of FIG. 1A illustrating a transaction card, in accordance with some embodiments of the present disclosure.
Figure 2A:
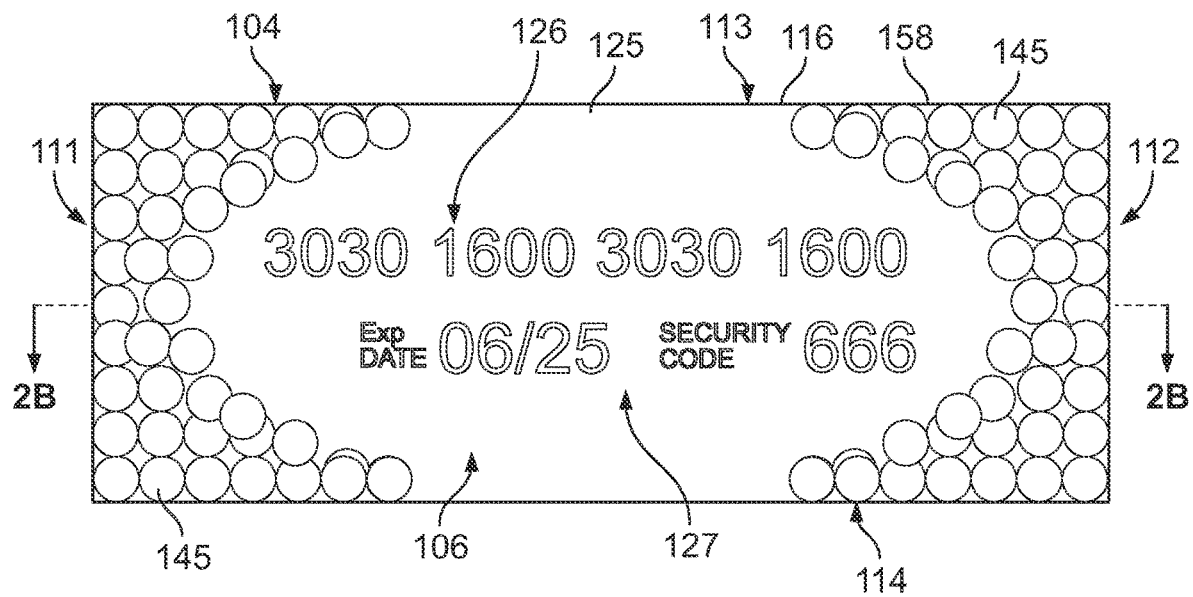
FIG. 2A is a top view illustrating a transaction card, in accordance with some embodiments of the present disclosure.
Figure 2B:
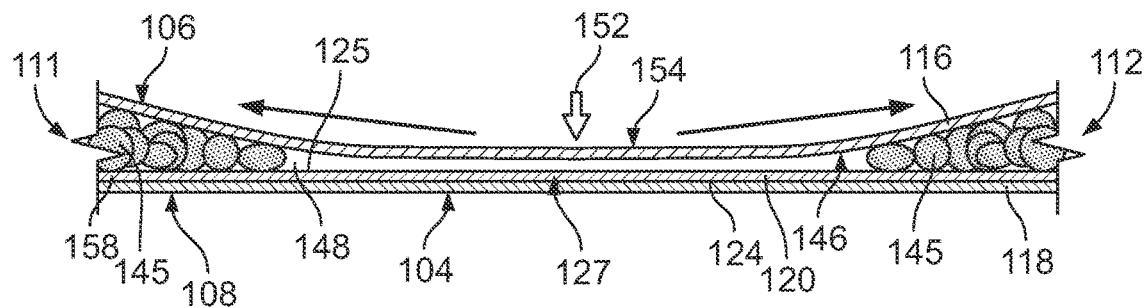
FIG. 2B is a side cross-sectional view along cutline A-A' of FIG. 2A illustrating a transaction card, in accordance with some embodiments of the present disclosure.

As shown in FIGS. 1A-1B, in a natural or relaxed state, the beads 145 and the carrier 148 spread substantially evenly across a majority or all of the first main side 106 of the body 104 to block or obscure the account identification indicia 126 present along the upper surface 125 of the internal layer 120. Furthermore, as shown in FIGS. 2A-2B, when a force 152 is applied to the body 104, e.g., in a central area 154 of the first main side 106, the first outer layer 116 is depressed towards the internal layer 120 and the beads 145 are forced towards an outer perimeter 158 of the body 104, thus exposing the account identification indicia 126. In some embodiments, the force 152 also causes the beads 145 to elastically deform. As shown in FIG. 2B, the force 152 may cause the first exterior layer 116 to deform towards the internal layer 120. Once the pressure is removed from the body 104, the account identification indicia 126 remains visible for a period of time depending on the viscosity of the carrier 148. As pressure within the cavity 146 normalizes and the first exterior layer 116 begins to move away from the internal layer 120, the beads 145 and the carrier 148 may again return to the central area 127 of the upper surface 125 of the internal layer 120 to cover the account identification indicia 126.

The rate at which the beads 145 and carrier 148 return to the natural relaxed state may further depend upon the number and/or size of the beads 145, the material type of the carrier 148, the temperature of the carrier 148, the pressure within the cavity 146, and a height/distance between the upper surface 125 of the internal layer 120 and the first outer layer 116. More specifically, larger beads tend to move at a relatively slower rate than smaller beads, a carrier with a higher viscosity tends to move at a relatively slower rate than a carrier with a lower viscosity, a warmer temperature carrier tends to move at a relatively faster rate than a cooler temperature carrier, and a larger distance between the upper surface of the internal layer and the first outer layer may cause the carrier and the beads to move at a relatively faster rate than a smaller distance. It will be appreciated that these variables may be optimized, as desired, to allow a user sufficient time to view the account identification indicia 126 without exposing the account identification indicia 126 for any longer than is necessary.

Figure 3:
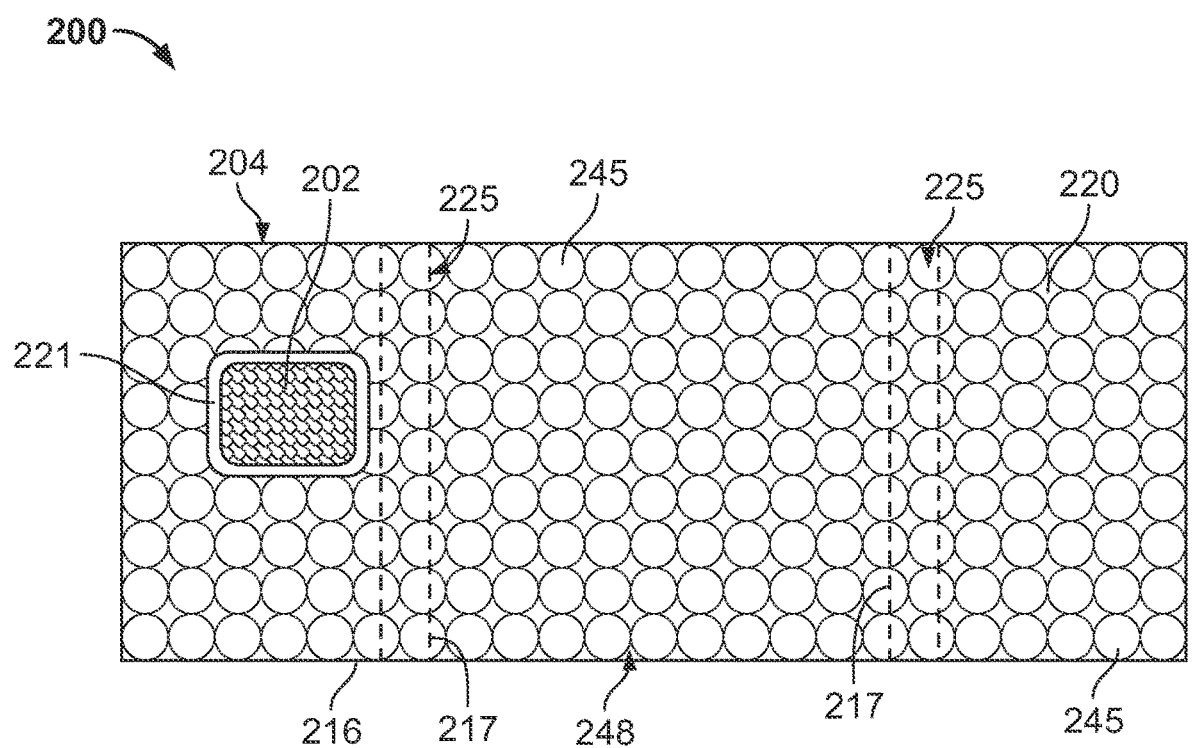
FIG. 3 is a top view illustrating a transaction card, in accordance with some embodiments of the present disclosure.

FIG. 3 demonstrates a transaction card 200 (hereinafter "card") according to another embodiment of the disclosure. The transaction card 200 may be the same or similar to the card 100 above. As such, only certain aspects of the card 200 will hereinafter be described for the sake of brevity. The card 200 may include a body 204 having a first main side opposite a second main side, and a plurality of beads 245 and a carrier 248 (e.g., viscous material) disposed between an internal layer 220 and a first outer layer 216.

In this embodiment, the card 200 may include a contact pad or chip 202, which may be any microprocessor device configured to exchange data electromagnetically. RFID chips may include a radio frequency inductor, volatile or non-volatile memory storage, a microprocessor, circuitry logic, and/or an antenna. While in some embodiments electromagnetic data communications from RFID chips will take place at radio frequencies, other embodiments may exchange electromagnetic data at different frequencies. Although non-limiting, the chip 202 may be recessed into the first main side of the body 204. In some embodiments, the chip 202 is set within a chip housing 221, which separates the plurality of beads 245 and the carrier 248 from the chip 202. The chip may extend through an opening of the first outer layer 216, as shown.

As further shown, the card 200 may include one or more recesses or channels 225 formed in the internal layer 220. In other embodiments, the channels 225 are defined by one or more walls 217 extending towards an interior of the first outer layer 216. Although non-limiting, the channels 225 may extend between opposite sides of the body 204. In other embodiments, the channels and/or walls 217 may be arranged into a logo or fanciful design. During use, the channels 225 and/or walls 217 are configured to restrict movement of the beads, e.g., to slow the return of the beads 245 and the carrier 248 to the central area the internal layer 220 after the account identification indicia has been exposed. It will be appreciated that the number and arrangement of the channels 225 and/or walls 217 is not limited to the embodiment shown.

Figure 4:
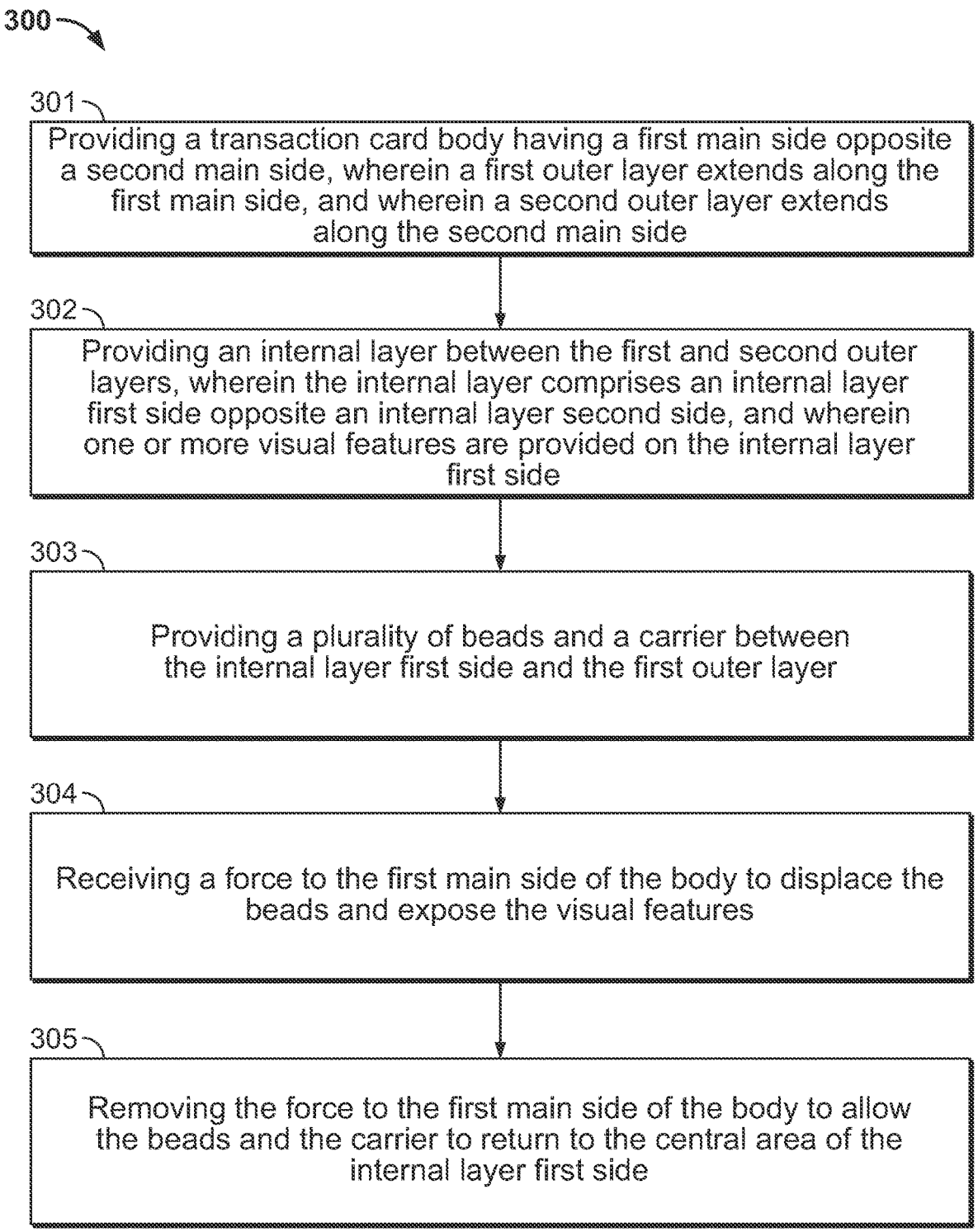
FIG. 4 illustrates a flowchart for performing methods in accordance with some embodiments of the present disclosure.

Turning now to FIG. 4, a method 300 of using the card 100 and/or the card 200 according to embodiments of the disclosure will be described in greater detail. At block 301, the method 300 may include providing a transaction card body having a first main side opposite a second main side, wherein a first outer layer extends along the first main side, and wherein a second outer layer extends along the second main side.

At block 302, the method 300 may include providing an internal layer between the first and second outer layers, wherein the internal layer comprises an internal layer first side opposite an internal layer second side, and wherein one or more visual features are provided on the internal layer first side. In some embodiments, the one or more visual features includes account identification indicia provided in a central area of the internal layer first side.

At block 303, the method 300 may include providing a plurality of beads and a carrier between the internal layer first side and the first outer layer. In some embodiments, the carrier is a high-viscosity liquid, oil, or gel.

At block 304, the method 300 may include receiving a force, pressure, or impact to the first main side of the body to displace the beads. In one embodiment, the force is applied to an area of the body containing the account identification indicia to expose the account identification indicia.

At block 305, the method 300 may further include removing the force applied to the first main side of the body to allow the beads and the carrier to return to the central area of the internal layer first side. In some embodiments, an amount of time it takes for the beads and the carrier to fully return to the central area and to cover the account identification indicia may depend upon the viscosity of the carrier, the size and/or amount of the beads, the temperature of the carrier, and/or a space between the first outer layer and the internal layer.

The foregoing discussion has been presented for purposes of illustration and description and is not intended to limit the disclosure to the form or forms disclosed herein. For example, various features of the disclosure may be grouped together in one or more aspects, embodiments, or configurations for the purpose of streamlining the disclosure. However, it should be understood that various features of the certain aspects, embodiments, or configurations of the disclosure may be combined in alternate aspects, embodiments, or configurations. Moreover, the following claims are hereby incorporated into this Detailed Description by this reference, with each claim standing on its own as a separate embodiment of the present disclosure.

The use of "including," "comprising," or "having" and variations thereof herein is meant to encompass the items listed thereafter and equivalents thereof as well as additional items. Accordingly, the terms "including," "comprising," or "having" and variations thereof are open-ended expressions and can be used interchangeably herein.

The phrases "at least one", "one or more", and "and/or", as used herein, are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

All directional references (e.g., proximal, distal, upper, lower, upward, downward, left, right, lateral, longitudinal, front, back, top, bottom, above, below, vertical, horizontal, radial, axial, clockwise, and counterclockwise) are only used for identification purposes to aid the reader's understanding of the present disclosure, and do not create limitations, particularly as to the position, orientation, or use of this disclosure. Connection references (e.g., attached, coupled, connected, and joined) are to be construed broadly and may include intermediate members between a collection of elements and relative movement between elements unless otherwise indicated. As such, connection references do not necessarily infer that two elements are directly connected and in fixed relation to each other.

Furthermore, identification references (e.g., primary, secondary, first, second, third, fourth, etc.) are not intended to connote importance or priority, but are used to distinguish one feature from another. The drawings are for purposes of illustration only and the dimensions, positions, order and relative sizes reflected in the drawings attached hereto may vary.

Although non-limiting, the cards 100 and 200 described herein may have standardized dimensions. For example, ISO/IEC 7816 is an international standard related to electronic identification cards with contacts, especially smart cards, managed jointly by the International Organization for Standardization (ISO) and the International Electrotechnical Commission (IEC). There are other standards, however, such as ISO/IEC 14443 for contactless cards (PayPass, PayWave, ExpressPay). A further standard ISO/IEC 7810 ID-1, with which most credit cards are compliant, defines dimensions as 85.60×53.98 mm (3.370×2.125 in) and a thickness of 0.76 mm (0.030 in).

Furthermore, the terms "substantial" or "substantially," as well as the terms "approximate" or "approximately," can be used interchangeably in some embodiments, and can be described using any relative measures acceptable by one of ordinary skill in the art. For example, these terms can serve as a comparison to a reference parameter, to indicate a deviation capable of providing the intended function. Although non-limiting, the deviation from the reference parameter can be, for example, in an amount of less than 1%, less than 3%, less than 5%, less than 10%, less than 15%, less than 20%, and so on.

Still furthermore, although the illustrative method 300 is described above as a series of acts or events, the present disclosure is not limited by the illustrated ordering of such acts or events unless specifically stated. For example, some acts may occur in different orders and/or concurrently with other acts or events apart from those illustrated and/or described herein, in accordance with the disclosure. In addition, not all illustrated acts or events may be required to implement a methodology in accordance with the present disclosure. Furthermore, the method 300 may be implemented in association with the formation and/or processing of structures illustrated and described herein as well as in association with other structures not illustrated.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Furthermore, the present disclosure has been described herein in the context of a particular implementation in a particular environment for a particular purpose. Those of ordinary skill in the art will recognize the usefulness is not limited thereto and the present disclosure may be beneficially implemented in any number of environments for any number of purposes. Thus, the claims set forth below are to be construed in view of the full breadth and spirit of the present disclosure as described herein.

What is claimed is:

1. A transaction card, comprising:
   a body having a first main side opposite a second main side, wherein a first outer layer extends along the first main side;
   an internal layer adjacent the first outer layer, wherein one or more visual features are provided on the internal layer; and
   a plurality of beads within a carrier, wherein the plurality of beads and the carrier are positioned between the internal layer and the first outer layer, and wherein a pressure applied to the first main side of the body to depress the outer layer towards the internal layer, displaces one or more beads of the plurality of beads to expose the one or more visual features on the internal layer.

2. The transaction card of claim 1, wherein the plurality of beads are suspended within the carrier.

3. The transaction card of claim 1, wherein a second outer layer extends along the second main side of the body.

4. The transaction card of claim 1, wherein the carrier is a viscous liquid.

5. The transaction card of claim 1, wherein the one or more visual features includes account identification indicia.

6. The transaction card of claim 1, wherein each microsphere of the plurality of beads is a micro-glass bead.

7. The transaction card of claim 1, wherein the first outer layer is transparent, and wherein the internal layer is opaque.

8. The transaction card of claim 1, further comprising an identification chip coupled to the first main side of the body.

9. The transaction card of claim 8, wherein the identification chip is separated from the plurality of beads and the carrier by a chip housing.

10. A transaction card, comprising:
    a body having a first main side opposite a second main side, wherein a first outer layer extends along the first main side, and wherein a second outer layer extends along the second main side;
    an internal layer between the first outer layer and the second outer layer, wherein the internal layer comprises an internal layer first side opposite an internal layer second side, and wherein one or more visual features are provided on the internal layer first side; and
    a plurality of beads and a carrier positioned between the internal layer first side and the first outer layer, wherein a force applied to the first main side of the body to depress the first outer layer towards the internal layer, displaces one or more beads of the plurality of beads to expose the one or more visual features on the internal layer.

11. The transaction card of claim 10, wherein the plurality of beads are suspended within the carrier, and wherein the carrier is a viscous liquid.

12. The transaction card of claim 10, wherein the one or more visual features includes account identification indicia, and wherein the force applied to the first main side of the body displaces the one or more beads of the plurality of beads towards an outer perimeter of the body and away from a central area of the internal layer to visually expose the account identification indicia.

13. The transaction card of claim 10, wherein each microsphere of the plurality of beads is a micro-glass bead, and wherein the micro-glass bead is opaque or translucent.

14. The transaction card of claim 10, wherein the first outer layer is transparent, and wherein the internal layer is opaque.

15. The transaction card of claim 10, further comprising an identification chip coupled to the first main side of the body.

16. A transaction card, comprising:
- a body having a first main side opposite a second main side, wherein a first outer layer extends along the first main side, and wherein a second outer layer extends along the second main side;
- an internal layer between the first outer layer and the second outer layer, wherein the internal layer comprises an internal layer first side opposite an internal layer second side, and wherein one or more visual features are provided on the internal layer first side; and
- a plurality of beads and a carrier positioned between the internal layer first side and the first outer layer, wherein in a first configuration the plurality of beads are positioned over the one or more visual features to visually obscure the one or more visual features, and wherein in a second configuration, one or more beads of the plurality of beads are displaced to expose the one or more visual features, wherein a pressure applied to the first main side of the body to depress the first outer layer towards the internal layer, changes the plurality of beads from the first configuration to the second configuration.

17. The transaction card of claim 16, wherein the plurality of beads are suspended within the carrier, and wherein the carrier is a translucent, viscous liquid.

18. The transaction card of claim 16, wherein the one or more visual features includes sensitive card information.

19. The transaction card of claim 16, wherein a pressure applied to a central area of the first main side of the body causes the one or more beads of the plurality of beads to be displaced towards an outer perimeter of the body and away from a central area of the internal layer to visually expose the one or more visual features, and wherein removing the pressure applied to the central area of the first main side of the body allows the one or more beads of the plurality of beads to move towards the central area of the internal layer.

20. The transaction card of claim 16, wherein the first outer layer and the second outer layer are transparent, and wherein the internal layer is opaque.

\* \* \* \* \*